US012175909B2

(12) United States Patent
Park et al.

(10) Patent No.: US 12,175,909 B2
(45) **Date of Patent: *Dec. 24, 2024**

(54) MURA COMPENSATION CIRCUIT AND DRIVING APPARATUS FOR DISPLAY APPLYING THE SAME

(71) Applicant: SILICON WORKS CO., LTD., Daejeon (KR)

(72) Inventors: Jun Young Park, Daejeon (KR); Ki Taek Kim, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/373,096

(22) Filed: Sep. 26, 2023

(65) Prior Publication Data

US 2024/0029613 A1 Jan. 25, 2024

Related U.S. Application Data

(63) Continuation of application No. 17/968,623, filed on Oct. 18, 2022, now Pat. No. 11,823,606, which is a (Continued)

(30) Foreign Application Priority Data

Dec. 26, 2019 (KR) ........................ 10-2019-0175221

(51) Int. Cl.
*G09G 3/20* (2006.01)

(52) U.S. Cl.
CPC ......... *G09G 3/2003* (2013.01); *G09G 3/2007* (2013.01); *G09G 2320/0233* (2013.01); (Continued)

(58) Field of Classification Search
CPC ... G09G 2320/0233; G09G 2320/0242; G09G 2320/0276; G09G 2320/0626; (Continued)

(56) References Cited

U.S. PATENT DOCUMENTS

| | | | |
|---|---|---|---|
| 7,050,074 | B1 | 5/2006 | Koyama |
| 8,665,295 | B2 | 3/2014 | Leon et al. |

(Continued)

FOREIGN PATENT DOCUMENTS

| | | | |
|---|---|---|---|
| CN | 1512249 A | 7/2004 | |
| CN | 1979603 A | 6/2006 | |

(Continued)

OTHER PUBLICATIONS

Taiwanese Office Action dated May 7, 2024 issued in Patent Application No. 11320462450 (3 pages).

(Continued)

*Primary Examiner* — Kenneth Bukowski
(74) *Attorney, Agent, or Firm* — POLSINELLI PC

(57) ABSTRACT

A display device includes a display panel configured to display an image; a restoring unit configured to receive a data packet and sequentially restoring display data corresponding to red, green and blue colors of sub-pixels from the data packet; a mura compensation circuit configured to receive the restored display data, generate adjusted compensation values and compensate for mura on the display data corresponding to the colors of the sub-pixels using the adjusted compensation values corresponding to location information of the sub-pixels having the mura; and an output circuit configured to receive the mura compensated display data and output a source signal to the display panel in accordance with the data packet, wherein the adjusted compensation values are generated by applying a first gain that is proportionally increased from 0% to 100% at a first region (Continued)

between a lowest gray scale and a first gray scale, a second gain that is 100% at a second region between the first gray scale and a second gray scale, and a third gain that is proportionally decreased from 100% to 0% at a third region between the second gray scale and a highest gray scale.

12 Claims, 3 Drawing Sheets

Related U.S. Application Data continuation of application No. 17/126,525, filed on Dec. 18, 2020, now Pat. No. 11,508,281.

(52) U.S. Cl.
CPC ............... *G09G 2320/0242* (2013.01); *G09G 2320/0626* (2013.01); *G09G 2320/0673* (2013.01)

(58) Field of Classification Search
CPC ....... G09G 2320/0673; G09G 2370/10; G09G 3/2003; G09G 3/2007
See application file for complete search history.

(56) References Cited

U.S. PATENT DOCUMENTS

| | | | | |
|---|---|---|---|---|
| 9,299,283 | B2 | 3/2016 | Chun et al. | |
| 10,573,236 | B1 | 2/2020 | Gao et al. | |
| 2007/0091041 | A1 | 4/2007 | Chung et al. | |
| 2007/0126758 | A1 | 6/2007 | Hwang | |
| 2014/0327704 | A1 | 11/2014 | Wei et al. | |
| 2015/0187289 | A1 | 7/2015 | Kim et al. | |
| 2015/0371579 | A1 | 12/2015 | Yu et al. | |
| 2016/0118000 | A1 | 4/2016 | Kim | |
| 2016/0163246 | A1 | 6/2016 | Lee et al. | |
| 2018/0047326 | A1 | 2/2018 | Tsuchida | |
| 2018/0246375 | A1* | 8/2018 | Zhang | G02F 1/133602 |
| 2018/0330682 | A1 | 11/2018 | Zhang | |
| 2018/0342211 | A1 | 11/2018 | Zhang | |
| 2020/0143751 | A1 | 5/2020 | Byun | |
| 2021/0150965 | A1 | 5/2021 | Zhang et al. | |

FOREIGN PATENT DOCUMENTS

| | | | |
|---|---|---|---|
| CN | 104103236 | A | 10/2014 |
| CN | 109584798 | A | 4/2019 |
| CN | 110444176 | A | 11/2019 |
| JP | 2016-0075771 | A | 10/2017 |
| JP | 2018-0025639 | A1 | 8/2019 |
| KR | 2007-0044711 | B1 | 4/2007 |
| KR | 10-2011-0098914 | A | 9/2011 |
| KR | 2015-0078839 | B1 | 7/2015 |
| KR | 10-2019-0027266 | A | 3/2019 |
| KR | 10-2019-0030124 | A | 3/2019 |
| TW | 201445543 | A | 12/2014 |

OTHER PUBLICATIONS

Korean Notice of Allowance dated Jul. 15, 2024 issued in Patent Application No. 10-2019-0175221 (2 pages).

Chinese Office Action dated Sep. 28, 2024 issued in Patent Application No. 202011491071.8 (7 pages).

* cited by examiner

MURA COMPENSATION CIRCUIT AND DRIVING APPARATUS FOR DISPLAY APPLYING THE SAME

CROSS-REFERENCE TO RELATED APPLICATIONS

The present application is a continuation of U.S. application Ser. No. 17/968,623, filed on Oct. 18, 2022, which is a continuation of U.S. application Ser. No. 17/126,525, filed Dec. 18, 2020, now U.S. Pat. No. 11,508,281, issued on Nov. 22, 2022, which claims the priority of Korean Application No. 10-2019-0175221, filed Dec. 26, 2019, which are hereby incorporated by reference in their entirety.

BACKGROUND

Field of the Disclosure

The present disclosure relates to mura compensations, and more particularly, to a mura compensation circuit which prevents a change in color of a pixel upon mura compensations for the pixel and a driving apparatus for a display applying the same.

Description of the Background

Recently, an LCD panel or an OLED panel is used a lot as a display panel.

Mura may occur in the display panel due to a cause, such as an error in a manufacturing process. Mura means that a pixel or some region of a display image has non-uniform luminance in the form of stain. A defect occurring due to mura is called a mura defect.

The mura defect needs to be compensated for so that a display panel has improved picture quality.

A compensation value for compensating for mura of a pixel may be calculated using various methods. In general, a compensation value having a gain of 100% is applied.

To compensate for mura, a convergence function may be added. The convergence function is a technology for differently applying a gain to a compensation value depending on an input gray scale.

In a high gray scale range, if a compensation value for mura compensations having a gain of 100% is applied, a gray scale may be quickly saturated. Furthermore, in the case of a low gray scale range, it is difficult to predict a compensation value.

Accordingly, the convergence function is implemented to weakly apply a compensation gain from a specific gray scale toward the lowest gray scale in a low gray scale range or weakly apply a compensation gain from a specific gray scale toward the highest gray scale in a high gray scale range.

However, the mura compensation method has a problem in mura compensations for colors.

Illustratively, a pixel may include a combination of three colors of red R, blue B and green G. To represent a color of a pixel, a gray scale of red R may belong to a range in which a compensation value having a gain of 100% is applied. A gray scale of blue B or green G may belong to a high gray scale range or a low gray scale range to which the convergence function is applied.

In this case, to compensate for mura of the pixel, the gray scale of red R may be compensated for by the gain of 100%, but the gray scale of blue B or green G has a compensation range of a gain lower than 100%.

As described above, if mura of a pixel is compensated for by a gain having the same level for each color, the ratio of red R, blue B and green G constituting the color of the pixel is changed. As a result, the color of the pixel is changed.

Illustratively, a skin color may be changed to a green color.

The change in the color occurs because mura compensations are performed by applying a gain having the same level to gray scales.

Accordingly, in the case of mura compensations for the colors of a pixel, it is necessary to develop a mura compensation method capable of suppressing a change in the color.

SUMMARY

Accordingly, the present disclosure is directed to a mura compensation circuit and a driving apparatus applying the same that substantially obviate one or more of problems due to limitations and disadvantages described above.

More specifically, the present disclosure is to provide a mura compensation circuit capable of preventing a change in color of a pixel upon mura compensations for the pixel and a driving apparatus for a display applying the same.

In addition, the present disclosure is to provide a mura compensation circuit capable of suppressing a change in color of a pixel attributable to mura compensations, by applying an adjustment gain having the same ratio to colors to compensate for mura of the pixel, and a driving apparatus for a display applying the same.

Furthermore, the present disclosure is to provide a mura compensation circuit capable of suppressing a change in color of a pixel attributable to mura compensations, by performing the mura compensations on the pixel in consideration of a luminance change characteristic different for each color, and a driving apparatus for a display applying the same.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

To achieve these and other advantages and in accordance with the present disclosure, as embodied and broadly described, a display device includes a display panel configured to display an image; a restoring unit configured to receive a data packet and sequentially restoring display data corresponding to red, green and blue colors of sub-pixels from the data packet; a mura compensation circuit configured to receive the restored display data, generate adjusted compensation values and compensate for mura on the display data corresponding to the colors of the sub-pixels using the adjusted compensation values corresponding to location information of the sub-pixels having the mura; and an output circuit configured to receive the mura compensated display data and output a source signal to the display panel in accordance with the data packet, wherein the adjusted compensation values are generated by applying a first gain that is proportionally increased from 0% to 100% at a first region between a lowest gray scale and a first gray scale, a second gain that is 100% at a second region between the first gray scale and a second gray scale, and a third gain that is proportionally decreased from 100% to 0% at a third region between the second gray scale and a highest gray scale.

In another aspect of the present disclosure, method of driving a display device includes receiving a data packet and sequentially restoring display data corresponding to red, green and blue colors of sub-pixels from the data packet; receiving the restored display data, generating adjusted compensation values; compensating for mura on the display data corresponding to the red, green and blue colors of the sub-pixels using the adjusted compensation values corresponding to location information of the sub-pixels having the mura; outputting a source signal to a display panel in accordance with the data packet, wherein the adjusted compensation values are generated by applying a first gain that is proportionally increased from 0% to 100% at a first region between a lowest gray scale and a first gray scale, a second gain that is 100% at a second region between the first gray scale and a second gray scale, and a third gain that is proportionally decreased from 100% to 0% at a third region between the second gray scale and a highest gray scale.

The present disclosure applies an adjustment gain having the same ratio to the colors of a pixel upon mura compensations for the pixel.

Accordingly, the present disclosure may maintain a color of a pixel on which mura compensations are performed, because a combination ratio of the colors for representing the pixel is not greatly changed although the mura compensations are performed.

Furthermore, the present disclosure may suppress a change in color of a pixel attributable to mura compensations, because the mura compensations may be performed in consideration of luminance change characteristic different for each of the colors of the pixel.

Accordingly, the present disclosure has effects in that it may improve picture quality and secure the reliability of a driving circuit and a display device because mura compensations may be performed without a great change in the original color of a pixel.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings.

DETAILED DESCRIPTION

An aspect of the present disclosure is configured to apply an adjustment gain having the same ratio to compensation values to prevent a change in color of a pixel attributable to mura compensations.

Figure 1:
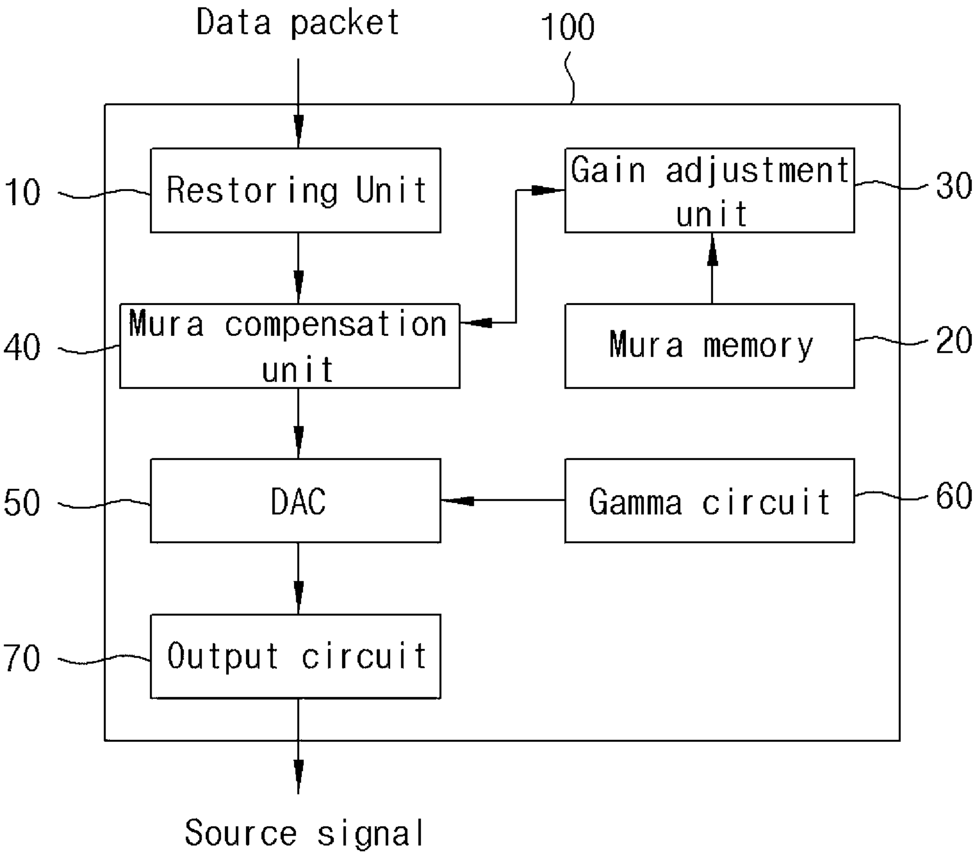
FIG. 1 is a block diagram illustrating a mura compensation circuit and a driving apparatus for a display applying the same according to an aspect of the present disclosure.

For a driving apparatus for a display according to an aspect of the present disclosure, reference may be made to FIG. 1. In FIG. 1, a mura compensation circuit may be understood to include a mura compensation unit 40, a gain adjustment unit 30, and a mura memory 20.

In FIG. 1, a driving apparatus 100 includes a restoring unit 10, the mura memory 20, the gain adjustment unit 30, the mura compensation unit 40, a digital-to-analog converter (DAC) a gamma circuit 60, and an output circuit 70.

The driving apparatus 100 may provide a display panel (not illustrated) with a source signal in accordance with an input data packet, and may perform mura compensations on a mura pixel.

In the driving apparatus 100, the restoring unit 10 receives a data packet and restores display data from the data packet.

A pixel may have a color represented by a combination of three colors of red R, blue B and green G. Accordingly, the data packet includes display data corresponding to red R, blue B and green G. The restoring unit 10 sequentially restores the display data corresponding to red R, blue B and green G of one pixel.

The data packet may include a clock, control data, etc. necessary for a display, in addition to the display data. The restoring unit 10 may also restore the clock and the control data and provide the clock and the control data to necessary parts.

Figure 2:
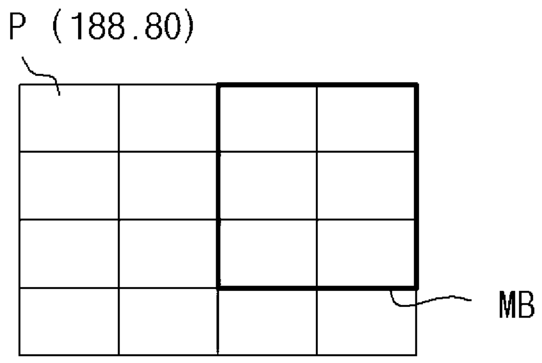
FIG. 2 is a diagram illustrating mura.

In the display panel, mura may appear in a pixel or a block unit. Mura formed in a block unit may be understood with reference to FIG. 2. In FIG. 2, "MB" indicates a mura block. Each of pixels included in the mura block MB may be understood to have mura.

As illustrated in FIG. 2, each pixel may have location information. A pixel P may be configured to have location information for location values in the row and column. Illustratively, location information of the pixel P at the left uppermost end of FIG. 2 may be defined as (188, 80).

Furthermore, in FIG. 2, compensation values for compensating for mura of distorted colors may be set for each of the pixels included in the mura block MB.

In the case of a color mode (or an RGB mode), compensation values for mura compensations may be defined with respect to display data corresponding to red R, display data corresponding to blue B, and display data corresponding to green G, respectively.

As described above, location information of a pixel having mura and compensation values for the colors may be obtained in a test process.

A method of calculating the compensation values in the test process may be variously set depending on a manufacturer's intention, and a detailed description thereof is omitted.

The compensation values calculated in the test process as described above may be stored in the mura memory 20 of the driving apparatus 100.

Accordingly, the mura memory 20 may store mura information, including location information of a pixel having mura and compensation values for the colors thereof.

The gain adjustment unit 30 is configured to provide adjustment compensation values generated by applying an adjustment gain having the same ratio to compensation values for the colors of a pixel. A detailed operation of the gain adjustment unit 30 is described later with reference to FIG. 3 and FIG. 4.

Furthermore, the mura compensation unit 40 may receive display data of the colors of a pixel from the restoring unit 10, and may provide the gain adjustment unit 30 with location information of the pixel. Furthermore, the mura compensation unit 40 receives adjustment compensation values, corresponding to the location information, provided by the gain adjustment unit 30.

Furthermore, the mura compensation unit 40 performs mura compensations on the display data of the colors of the pixel using the adjustment compensation values corresponding to the location information, and outputs the display data of the colors of the pixel on which the mura compensations have been performed.

The mura compensations on the display data of the colors of the pixel may be understood to be sequentially performed.

The DAC 50 may output, as an analog signal, the display data output by the mura compensation unit 40.

The DAC 50 may be understood to include a latch for latching display data, a shift register for shifting the latched display data, and a digital-to-analog conversion circuit for converting the shifted display data into an analog signal, and is briefly illustrated for convenience of description.

The gamma circuit 60 is configured to provide the DAC 50 with the same number of gamma voltages as the gray scales in a gray scale range.

Accordingly, the DAC 50 may select a gamma voltage corresponding to a digital value of display data, and may output the selected gamma voltage as an analog signal.

The output circuit 70 may output a source signal for driving the analog signal output by the DAC 50, and may be configured using an output buffer, for example.

As described above, the gain adjustment unit 30 is configured to prevent a change in color of a pixel upon mura compensations for the pixel, and provides an adjustment gain having the same ratio to be applied to the colors of the pixel.

To this end, the gain adjustment unit 30 receives display data and location information of the pixel from the mura compensation unit 40. The location information may be included in control data corresponding to the display data, and a detailed example thereof is omitted.

The gain adjustment unit 30 receives, from the mura memory 20, compensation values for the colors corresponding to the location information, generates adjustment compensation values by applying the adjustment gain having the same ratio to the compensation values for the colors, and provides the adjustment compensation values to the mura compensation unit 40.

Illustratively, the gain adjustment unit 30 may select, as the adjustment gain for the colors of the pixel, the lowest compensation ratio of compensation ratios applied to the gray scales of the display data, and may generate and provide the adjustment compensation values.

This is specifically described with reference to FIG. 3 and FIG. 4.

Figure 3:
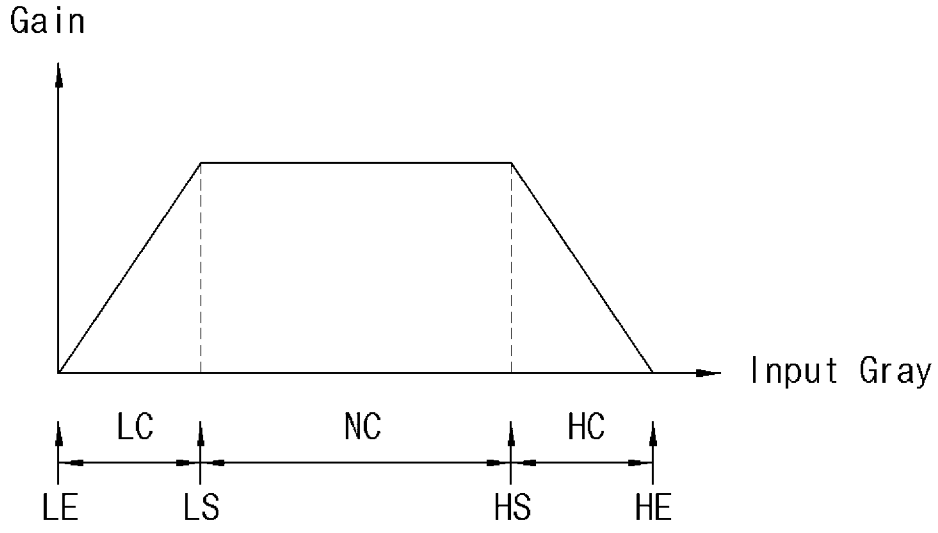
FIG. 3 is a graph illustrating a relation between an input gray scale and a gain for a convergence function.

A compensation ratio for an input gray scale, that is, a compensation gain, may be set as in FIG. 3.

In FIG. 3, the lowest gray scale is indicated as "LE", a first gray scale is indicated as "LS", a second gray scale is indicated as "HS", and the highest gray scale is indicated as "HE." In this case, the second gray scale HS is higher than the first gray scale, and if a gray scale range is set from gray scale 0 to gray scale 255, illustratively, the first gray scale may be set as gray scale 64 and the second gray scale may be set as gray scale 192.

Furthermore, "LC" indicates a low gray scale range of the lowest gray scale LE or more to less than the first gray scale LS. "NC" indicates a middle gray scale range of the first gray scale LS or more to the second gray scale HS or less. "HC" indicates a high gray scale range of more than the second gray scale HS to the highest gray scale HE or less.

As illustrated in FIG. 3, if an input gray scale corresponds to the middle gray scale range NC, a compensation ratio of 100% is applied.

If the input gray scale belongs to the low gray scale range LC, a lower compensation ratio is applied as the gray scale becomes lower.

Furthermore, if the input gray scale belongs to the high gray scale range HC, a lower compensation ratio is applied as the gray scale becomes higher.

The convergence function is applied to the low gray scale range LC and the high gray scale range HC. In the low and high gray scale ranges, a compensation ratio for a compensation value is differently applied depending on the gray scale.

In an aspect of the present disclosure, the gain adjustment unit 30 is configured to provide adjustment compensation values generated by applying an adjustment gain having the same ratio to compensation values for the colors of a pixel.

Figure 4:
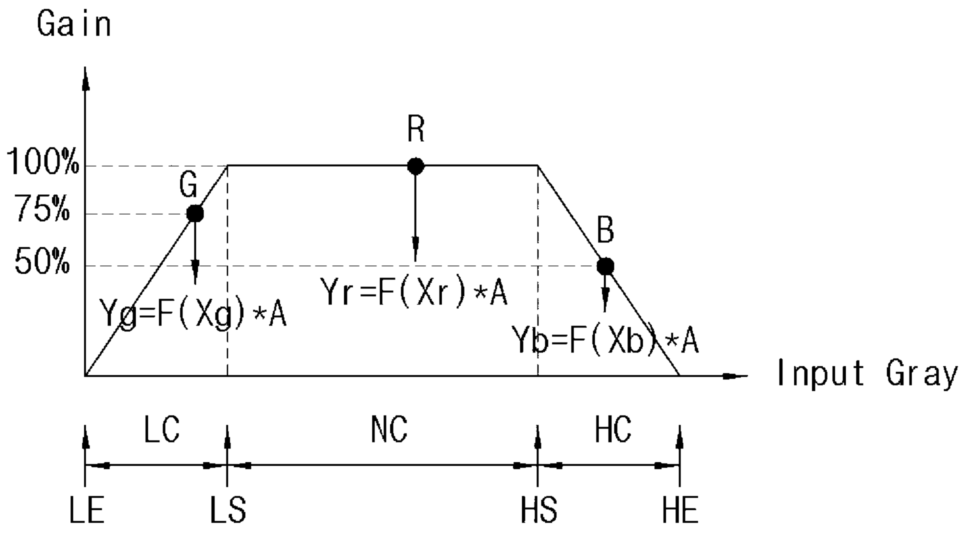
FIG. 4 is a graph illustrating that an adjustment gain having a given ratio is applied according to an aspect of the present disclosure.

That is, as illustrated in FIG. 4, an adjustment gain A having the same ratio may be applied to compensation values for the colors.

In FIG. 4, F(Xr) is a compensation value for red R, A is the adjustment gain, and Yr is an adjustment compensation value for red R. Furthermore, F(Xg) is a compensation value for green G, and Yg is an adjustment compensation value for green G. Furthermore, F(Xb) is a compensation value for blue B, and Yb is an adjustment compensation value for blue B.

As illustrated in FIG. 4, an aspect of the present disclosure may provide the adjustment compensation values Yr, Yg and Yb generated by applying the adjustment gain A having the same ratio to compensation values for the colors of a pixel.

In this case, although mura compensations for a pixel are performed, the ratio of red R, blue B and green G constituting the color of the pixel may be maintained. The color of the pixel represented by a combination of red R, blue B and green G may be maintained.

For example, the lowest compensation ratio of compensation ratios applied to the gray scales of display data of a pixel may be selected and applied as an adjustment gain having the same ratio, which is applied to the colors of the pixel.

Figure 5:
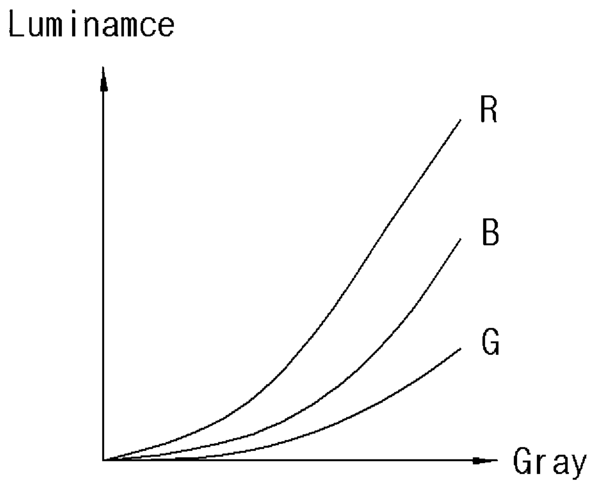
FIG. 5 is a graph illustrating a luminance change characteristic corresponding to a gray scale for each color of a pixel.

Colors may have different luminance change characteristics. FIG. 5 illustrates luminance change characteristics corresponding to gray scales of the colors of a pixel.

Accordingly, the gain adjustment unit 30 may have a color characteristic compensation value (s) for one or two or more colors to compensate for the luminance change characteristic different for each color, and may additionally apply a characteristic compensation value (s) to the compensation values for the color (s).

In this case, a luminance change characteristic different for each of the colors of a pixel may be compensated for upon mura compensations for the pixel, and a change in color of the pixel attributable to the mura compensations may be effectively suppressed.

Accordingly, the present disclosure has effects in that it can improve picture quality and secure the reliability of a driving circuit and a display device because mura compensations can be performed without a great change in the original color of a pixel.

It will be apparent to those skilled in the art that various modifications and variations can be made in the mura compensation circuit and the device apparatus applying the same of the present disclosure without departing from the spirit or scope of the aspects of the present disclosure. Thus, it is intended that the present disclosure covers the modifications and variations of the aspects provided they come within the scope of the appended claims and their equivalents.

What is claimed is:

1. A display device comprising:

a display panel configured to display an image;

a restoring circuit configured to receive a data packet and sequentially restoring display data corresponding to red, green and blue colors of sub-pixels from the data packet;

a mura compensation circuit configured to receive the restored display data, generate adjusted compensation values and compensate for mura on the display data corresponding to the colors of the sub-pixels using the adjusted compensation values corresponding to location information of the sub-pixels having the mura; and an output circuit configured to receive the mura compensated display data and output a source signal to the display panel in accordance with the data packet, wherein the adjusted compensation values are generated by applying a first gain that is proportionally increased from 0% to 100% at a first region between a lowest gray scale and a first gray scale, a second gain that is 100% at a second region between the first gray scale and a second gray scale, and a third gain that is proportionally decreased from 100% to 0% at a third region between the second gray scale and a highest gray scale.

2. The display device of claim 1, wherein the data packet includes a clock and control data.

3. The display device of claim 2, wherein the restoring circuit further restores the clock and the control data.

4. The display device of claim 1, further comprising a digital-to-analog converter configured to receive the mura compensated display data, latch the mura compensated display data, shift the latched mura compensated display data and convert the shifted mura compensated display data into an analog signal.

5. The display device of claim 4, further comprising a gamma circuit configured to output to the digital-to-analog converter with a same number of gamma voltages as a number of gray scales between the lowest gray scale and the highest gray scale.

6. The display device of claim 1, wherein the green color is located in the first region, the red color is located in the second region, and the blue color is located in the third region.

7. A method of driving a display device comprising:

receiving a data packet and sequentially restoring display data corresponding to red, green and blue colors of sub-pixels from the data packet;

receiving the restored display data, generating adjusted compensation values;

compensating for mura on the display data corresponding to the red, green and blue colors of the sub-pixels using the adjusted compensation values corresponding to location information of the sub-pixels having the mura;

outputting a source signal to a display panel in accordance with the data packet, wherein the adjusted compensation values are generated by applying a first gain that is proportionally increased from 0% to 100% at a first region between a lowest gray scale and a first gray scale, a second gain that is 100% at a second region between the first gray scale and a second gray scale, and a third gain that is proportionally decreased from 100% to 0% at a third region between the second gray scale and a highest gray scale.

8. The display device of claim 7, wherein the data packet includes a clock and control data.

9. The display device of claim 8, further comprising restoring the clock and the control data in addition to the display data.

10. The display device of claim 7, further comprising receiving the mura compensated display data, latching the mura compensated display data, shifting the latched mura compensated display data and converting the shifted mura compensated display data into an analog signal.

11. The display device of claim 10, further comprising outputting a same number of gamma voltages as a number of gray scales between the lowest gray scale and the highest gray scale.

12. The display device of claim 7, wherein the green color is located in the first region, the red color is located in the second region, and the blue color is located in the third region.

* * * * *